Patented June 12, 1923.

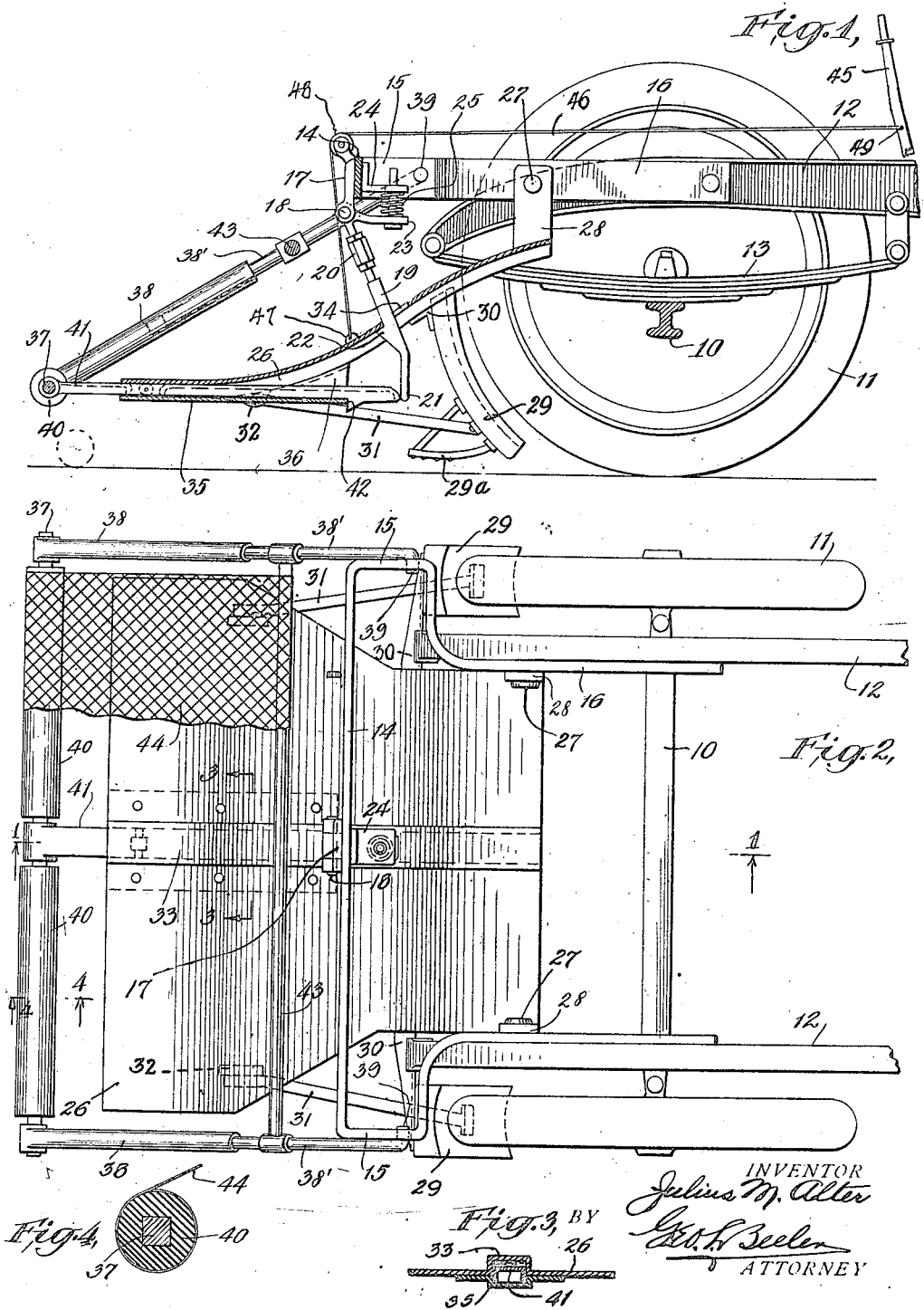

1,458,205

UNITED STATES PATENT OFFICE.

JULIUS M. ALTER, OF BROOKLYN, NEW YORK.

SAFETY ATTACHMENT FOR AUTOMOBILES.

Application filed February 20, 1922. Serial No. 537,855.

*To all whom it may concern:*

Be it known that I, JULIUS M. ALTER, a citizen of Russia, residing at New York city, borough of Brooklyn, in the county of Kings and State of New York, have invented certain new and useful Improvements in Safety Attachments for Automobiles, of which the following is a specification.

This invention relates to safety appliances for vehicles and especially road vehicles such as automobiles or other cars.

Among the objects of the invention is to provide a device in the nature of a fender carried upon the front portion of a vehicle and normally elevated slightly above the ground or roadway, but which when striking an obstacle will drop instantly to the ground and so receive thereon the obstacle with a high degree of safety.

More specifically stated the primary aim of this invention is to so equip an automobile that in case a person should be accidentally struck by the machine the resulting injury to such person would in all probability not be much more severe than a fright or perhaps a few bruises, whereas under ordinary circumstances the person is usually run over and seriously injured if not killed.

A further object of the invention is to provide a safety appliance for automobiles comprising a strong receiving member and having means for carrying it elevated slightly above the ground and a trip member also in advance of the receiving member so as to be first struck by the obstacle for tripping and releasing the receiving member so that the whole will drop promptly to the ground and compel the reception of the obstacle safely upon the receiving member.

A still further object of the invention is to provide brake members for co-operation with the vehicle wheels, said brake members being carried by some movable portion of the safety appliance, such as the receiving member aforesaid, and so are brought into gripping contact with said wheels and the ground or track when the receiving mechanism drops as aforesaid.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section approximately on the line 1—1 of Fig. 2.

Fig. 2 is a plan view.

Fig. 3 is a vertical transverse sectional detail on the line 3—3 of Fig. 2.

Fig. 4 is a sectional detail on the line 4—4 of Fig. 2.

Referring now more specifically to the drawings which indicate an application of my improvement to the front portion of an automobile, 10 indicates the front axle having wheels 11 connected thereto as usual, and supporting a frame 12 through springs 13. It will be understood that the parts thus far specified may be of any conventional design or construction.

14 indicates a strong bar extending across in front of the frame and having side portions 15 substantially U-shaped and terminating in rearwardly projecting ends 16 shown as secured in any suitable manner to the frame bars 12. The form or construction of the member 14 will naturally depend upon the specific design or type of the frame to which it is to be connected. It is desirable however that the bar 14 shall constitute for many purposes a bumper for effectually guarding the usual front parts of the machine such as the lamps, the radiator, the wheel fenders, or the like, and so when used will take the place of a bumper as otherwise ordinarily used.

Fastened preferably to the central part of the bar 14 is a hanger comprising a bracket 17 to the lower end of which is pivoted at 18 a trigger or hook 19 including a turn buckle 20 for determining the effective length thereof. The lower end of the hook is extended at 21 below the point 22 of the hook. The trigger includes a rearwardly extending arm 23 in the nature of a bell crank. Above this bell crank is a bracket 24 secured to the rear face of the bar 14, and between the bell crank and the bracket is an expansion spring 25 normally urging the trigger downward and forward.

The above mentioned receiver constituting the main part of the appliance, is indicated at 26, the same being substantially scoop shape or having a wide flaring and downwardly and forwardly projecting shape, the upper rear portion of which is brought relatively close below the frame bars 12 and from which it is suspended through horizontal aligned pivots 27. The connection between the pivots and the rear end of the receiver is through a pair of hangers 28. The axis of the pivots is well in advance of and above the axis of the wheels 11. Adjacent to each wheel is a brake shoe 29 rigidly secured to and suspended from the receiver 26, the same being attached to the under side of the receiver through connections 30 and 31, the latter including a pair of bars leading forward from the lower end of the shoes toward the front and bottom portion of the receiver where they are attached at 32. These shoes are normally carried adjacent to the tread portions of the wheels but sufficiently remote therefrom not to interfere with the free running of the wheels. The shoes are made preferably wide enough to cover the wheels even though the wheels may be steered laterally for turning purposes. Each shoe includes also a track or road grip 29$^a$ rigid therewith, the shoe as a whole being so designed that when the receiver drops, the shoe will engage the wheel whereby the shoe will be caused to come into direct contact with the ground or road causing an additional braking action and relatively sudden stoppage of the vehicle. Because the pivots 27 are located as described when the receiver drops toward the ground the shoes swing sharply downward with respect to the pivots 27 and into gripping contact with the tread portions of the wheels. The receiver is shown reinforced or stiffened along its vertical central portion with a channel formation 33 and adjacent to the central part of the receiver is formed a vertical slot 34 through which the trigger 19 projects and with the front end wall portion of the slot acting normally with the hook 22 for holding up the safety appliance in normal running position. Attached to the bottom of the receiver and constituting a part thereof is a plate 35 the bottom portion of which is flat and horizontal while the side portions 36 are curved upward following the upward trend of the receiver. The rear portion of this plate 35 is consequently generally formed as shown in Fig. 3 making with the channel 26 a guide which is rectangular in cross section.

In front of and above the front portion of the receiver is trip mecanism comprising a horizontal bar 37 whose ends are attached to the front ends of a pair of telescopic arms 38 pivoted at any convenient points at their rear ends, as in the U-members 15 of the bumper, at the points 39. The bar 37 is preferably covered with rubber 40 or the like constituting cushions but which are preferably held from rotation thereon and which when coming into contact with the ground, as shown in dotted lines in Fig. 1, will assist in bringing the machine quickly to a stop while at the same time compelling the obstacle being struck to be received on top of the receiver. Attached to the central portion of the bar 37 and extending rearward therefrom is a plunger 41 which projects all the way through the guideway between the channel 26 and the plate 35 into close proximity with the finger extension 21 of the trigger. This plunger is shown provided with a hook 42 which cooperating with the rear edge of the plate 35 will prevent the trip mechanism from moving too far forward. While the spring 25 acts to hold the trigger locked as shown in full lines in Fig. 1 the finger portion 21 thereof will lie substantially against the rear end of the plunger holding the hook 42 against the plate 35. When the obstacle is struck by the trip mechanism the cross bar 37 thereof will be moved backward slightly, as will be permitted by the telescoping of the parts of the arms 38, causing thereby the plunger to move backward throwing the trigger against the force of the spring 25 and so permitting the receiver to drop to the ground. The relatively slight extent of rearward movement necessary for the plunger to trip the trigger mechanism may be readily provided for with a slight looseness between the plunger and the guide-way, taking into account that during this initial movement of the trip member 37 it may be caused to move toward the pivots 39 as well as toward the trigger. After release however of the trigger all parts of the mechanism below the hanger 17 and trigger swing downward practically as a whole, but around the two axes 27 and 39.

The upper portions 38' of the arms 38 may be transversely connected and braced by a bar 43, tying the arms so that the pivot portions thereof can not become detached from their bearings. This bar 43 moreover may be utilized as an attachment for the upper or rear portion of a net 44 extending thence forward and downward to the trip mechanism bar 37. This net in use will serve to reduce the extent of injury to a person who may be picked up by the attachment, and it will serve also to bridge the gap between the trip bar 37 and the front edge of the receiver.

It will be noted that the trip mechanism may be relatively light and for this purpose may be made of light materials including parts of wood, and consequently the impact thereof against a person who may be struck thereby will be relatively slight and not likely to cause severe injury. This initial impact however will immediately trip the safety mechanism to drop it to the most favorable receiving position.

At 45 I indicate the usual emergency brake lever which is pushed forward by the driver while applying the emergency brakes in the usual manner. In order to operate this brake mechanism automatically and as a result of the dropping of the fender mechanism above described I provide a flexible connection 46 suitably attached as at 47 to the receiver and which after being guided over any suitable direction pulleys such as at 48 may be attached as at 49 to the lever 45. These connections are so designed that with the drop of the receiver to the ground the weight thereof will be sufficient, as will also the extent of movement thereof, to cause the setting of the standard emergency brake mechanism automatically.

I claim:

1. In a safety attachment as set forth, the combination with a frame and a bumper bar carried thereby, of a receiver pivoted to the frame and extending downward and forward therefrom to a position close above the ground, means suspended from the bumper bar for holding the receiver normally elevated, and trip mechanism in advance of the receiver and movable rearward relatively thereto to release said suspended holding means when striking an article disposed in alignment with or above the position of the receiver close to the ground, said trip mechanism including a pair of side arms having upper ends mounted for pivotal movement around a fixed axis, a cross bar extending between the front ends of the arms, and a brace extending between the mid portions of the arms and serving to hold the pivot portions of the arms in place.

2. A safety attachment for automobiles comprising in combination with a pair of frame members and a bumper bar connected thereto, a hanger extending downward from the central portion of the bumper and including a trigger, means acting upon the trigger tending to hold the same forward, a receiver pivotally suspended at its rear end from the frame members and extending forward and downward therefrom and having a slot through which said trigger projects and whereby the receiver is normally held elevated, and trip mechanism including a member movable rearward along the receiver to disengage the trigger from holding position, said receiver including a guideway and the member movable therealong being a plunger guided in said guideway.

3. Mechanism as set forth in claim 2 in which the plunger has means coacting with the guide member to limit the relative forward movement of the trip mechanism with respect to the receiver.

In testimony whereof I affix my signature.

JULIUS M. ALTER.